United States Patent
Arisaka

(10) Patent No.: US 7,791,996 B2
(45) Date of Patent: Sep. 7, 2010

(54) PLL CIRCUIT OPERATING BASED ON OUTPUT OF DELTA-SIGMA MODULATOR, AND OPTICAL DISK DEVICE INCLUDING PLL CIRCUIT

(75) Inventor: Katsumi Arisaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 610 days.

(21) Appl. No.: 11/769,199

(22) Filed: Jun. 27, 2007

(65) Prior Publication Data
US 2008/0008067 A1 Jan. 10, 2008

(30) Foreign Application Priority Data
Jul. 4, 2006 (JP) .............................. 2006-184452

(51) Int. Cl.
*G11B 7/00* (2006.01)
(52) U.S. Cl. ................ 369/47.27; 369/47.28; 369/53.34
(58) Field of Classification Search .............. 369/44.27, 369/44.28
See application file for complete search history.

(56) References Cited

U.S. PATENT DOCUMENTS

| | | | |
|---|---|---|---|
| 4,672,597 A * | 6/1987 | Yamazaki | 369/47.28 |
| 7,200,072 B2 | 4/2007 | Arisaka | 369/13.05 |
| 2003/0185128 A1 * | 10/2003 | Shoji et al. | 369/59.25 |
| 2005/0111318 A1 * | 5/2005 | Nakajima et al. | 369/47.27 |

FOREIGN PATENT DOCUMENTS

| | | |
|---|---|---|
| JP | 10-190468 | 7/1998 |
| JP | 2004-362630 | 12/2004 |

* cited by examiner

*Primary Examiner*—Wayne R Young
*Assistant Examiner*—Aneeta Yodichkas
(74) *Attorney, Agent, or Firm*—Fitzpatrick, Cella, Harper & Scinto

(57) ABSTRACT

A PLL circuit includes a wobbling detector for detecting a wobbling signal based on reflection light of an optical disk having a wobbled track, and a VCO that an oscillation frequency of its output varies according to its input. The PLL circuit controls the VCO based on a phase error between the output of the wobbling signal and the output of the VCO. In the PLL circuit, the phase error is detected by executing an arithmetic operation to the delta-sigma modulated wobbling signal at a predetermined clock and the output of the VCO.

2 Claims, 14 Drawing Sheets

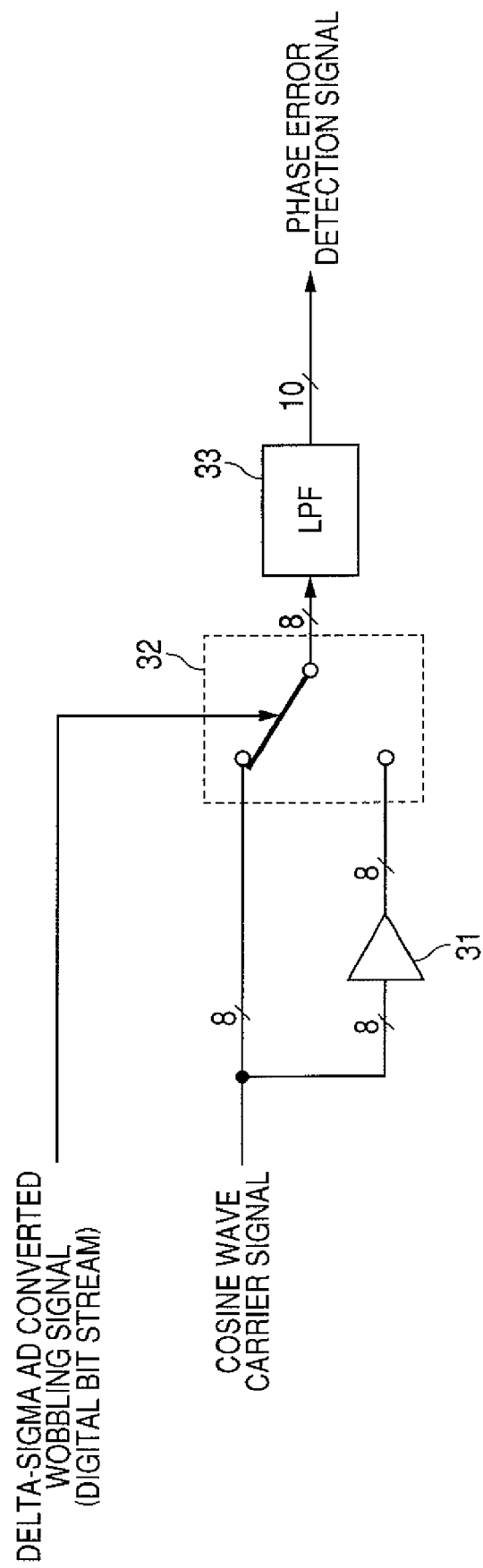

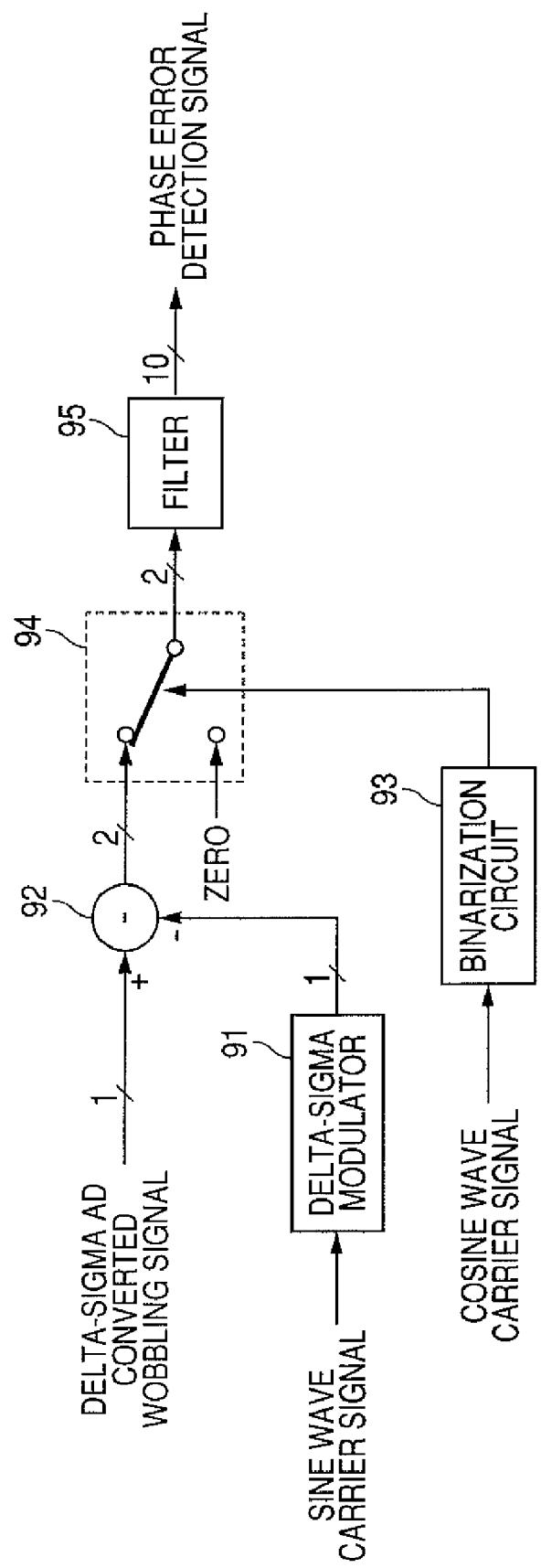

PLL CIRCUIT OPERATING BASED ON OUTPUT OF DELTA-SIGMA MODULATOR, AND OPTICAL DISK DEVICE INCLUDING PLL CIRCUIT

BACKGROUND OF THE INVENTION

1. Field of the Invention

The present invention relates to a PLL (phase-locked loop) circuit which is used in an optical disk device which records/reproduces information to/from a disk-like recording/reproducing medium. More particularly, the present invention relates to a PLL circuit which generates a signal of which the phase is synchronized with wobbling in case of recording/reproducing information to/from an optical disk on which the track is wobbled.

2. Description of the Related Art

Conventionally, in a case where data is recorded/reproduced to/from an optical disk, address information previously embedded on the optical disk is detected to search for a location on the disk, a desired track location on the disk is accessed based on the detected address information, and then user data is recorded/reproduced to/from the accessed location. Here, on many kinds of optical disks, address information and clock information are embedded by finely wobbling a groove in its width direction.

In the optical disk like this, typically a wobbling constitution has a sine wave shape, and thus a reproduced wobbling signal has approximately a sine wave shape. Then, the address information is embedded by executing modulation such as FSK (frequency shift keying), PSK (phase shift keying), MSK (minimum shift keying) or the like to a part of the reproduced wobbling signal or by providing pre-pits on the land between the adjacent grooves in parallel with the wobbling of the groove.

In case of reproducing the addresses on the optical disk like this, some kind or another carrier signal synchronized with the reproduced wobbling signal is generated, detection timing of the address information such as a PSK modulation component or a pre-pit arranged only a part of the wobbling is captured, and a bit value which is the address information is detected based on the captured timing.

Further, in order to execute velocity control to achieve constant liner velocity, spindle control is executed based on the above carrier signal so as to make a sine-wave frequency of the wobbling signal constant.

Consequently, as disclosed in Japanese Patent Application Laid-Open No. 2004-362630, a PLL circuit is used to generate the carrier signal synchronized with the wobbling signal. Here, the PLL circuit includes a phase comparator (phase error detector), a loop filter and a VCO (voltage controlled oscillator). Hereinafter, the PLL circuit which generates the carrier signal synchronized with the wobbling signal is called a wobble PLL circuit.

As a phase detection method in the wobble PLL circuit, a so-called heterodyne detection method of detecting a beat component which is a frequency difference between two signals respectively having close frequencies is used.

Incidentally, FIG. 14 illustrates an example of a PLL device (circuit). In FIG. 14, the PLL device includes an AD (analog-to-digital) converter 101 having a ten-bit width, a multiplier 102, an LPF (low-pass filter) (or a carrier cut filter) 103 for eliminating a frequency component twice the carrier signal, a loop filter 104, and a digital VCO 105. Here, it should be noted that the LPF 103 is also called a carrier cut filter as illustrated in FIG. 14.

In FIG. 14, a wobbling signal photoelectrically converted by a not-illustrated optical pickup and then reproduced through a matrix operation is converted into ten-bit digital data by the AD converter 101, and then multiplied to an eight-bit carrier signal by the multiplier 102. By doing so, a frequency difference component and a frequency sum component between the wobbling signal and the carrier signal are generated. Then, the generated frequency sum component is eliminated by the LPF 103 whereby only the generated frequency difference component can pass through the LPF 103. Subsequently, based on the passed frequency difference component, a control signal is properly generated by the loop filter 104 having a loop characteristic, and the generated control signal is then supplied to a control input of the digital VCO 105 to form a loop as illustrated in FIG. 14, thereby controlling the frequency of the carrier signal which is output from the digital VCO 105.

By applying such a constitution as above, it is possible to generate the carrier signal which is phase-locked with the wobbling signal.

Incidentally, there are occasions when the DC (direct current) characteristic and the amplitude of a wobbling signal sent from an optical disk vary according to an amount of laser beam and reflectance of the disk. Therefore, to be able to accurately process the wobbling signal like this, as disclosed in Japanese Patent Application Laid-Open No. 2004-362630 and the above description, the multi-bit AD converter is used. Further, in the multiplier disposed at the subsequent stage of the AD converter, the AD-converted signal is multiplied to the multi-bit carrier signal.

Here, if it is assumed that the frequency of the reproduced wobbling signal is about 960 KHz, a sampling signal of which the frequency is 20 times or more the frequency of the wobbling signal is necessary to accurately reproduce the signal, whereby the operation frequency of about 20 MHz is necessary for the AD converter. Further, if it is assumed that the number of bits of the AD converter is ten and the number of bits of the carrier signal is eight, the multiplier having the 18-bit output has to operate at 20 MHz.

Ordinarily, as the operation frequency or the number of bits of the AD converter increases, the circuitry of the AD converter itself becomes complicated, and also power consumption increases. Further, as the number of bits of each of the two inputs to be multiplied increases, the size of the circuitry of the later-stage multiplier increases. Furthermore, as the size of the circuitry increases, operation velocity in an actual IC circuit is limited.

On the other hand, if decreasing the number of bits of the wobbling signal or the carrier signal or decreasing the frequency of the sampling signal, it decreases an S/N ratio of the wobbling signal after digitalization or decreases an S/N ratio in case of phase error detection, thereby resultingly degrading phase detection accuracy. As a result, there is a fear that performance of the PLL circuit degrades.

Further, as described in Japanese Patent Application No. H10-190468, in case of achieving all or a part of the circuits such as the multiplier and the like by analog circuits, the whole constitution is sensitive to temperature characteristics and element variations, whereby it is difficult to maintain sufficient circuitry performance.

Furthermore, in case of recording/reproducing the data to/from the disk at a high velocity, it is necessary to detect the phase error in the wobble PLL circuit at a high velocity. However, the above-described conventional circuitry constitution is not suitable for such a high-velocity operation.

In consideration of such problems as described above, a constitution which suppresses circuitry size and power consumption and has sufficient circuitry performance is desired for the PLL circuit.

SUMMARY OF THE INVENTION

The present invention provides an optical disk device which records and/or reproduces information by irradiating an optical beam to an optical disk having a wobbled track, comprising: a wobbling detector adapted to detect a wobbling signal based on a reflection light of the irradiated optical beam; a delta-sigma modulator adapted to execute delta-sigma modulation to the detected wobbling signal based on a predetermined operation clock; a VCO (voltage controlled oscillator) of which an output oscillation frequency changes according to an input; a phase error detector adapted to detect a phase error between the delta-sigma modulated wobbling signal and a carrier signal output by the VCO, and output a phase error signal based on the detected phase error; and a loop filter adapted to execute a filter process to the phase error signal output by the phase error detector, wherein the VCO uses an output of the loop filter as an input signal.

Further features of the present invention will become apparent from the following description of the exemplary embodiments with reference to the attached drawings.

BRIEF DESCRIPTION OF THE DRAWINGS

FIG. 3 is a block diagram illustrating a phase error detector according to a first exemplary embodiment.

FIG. 12 is a block diagram illustrating a phase error detector according to a sixth exemplary embodiment.

DESCRIPTION OF THE EMBODIMENTS

Hereinafter, exemplary embodiments of the present invention will be described in detail with reference to the attached drawings.

First Exemplary Embodiment

Figure 1:
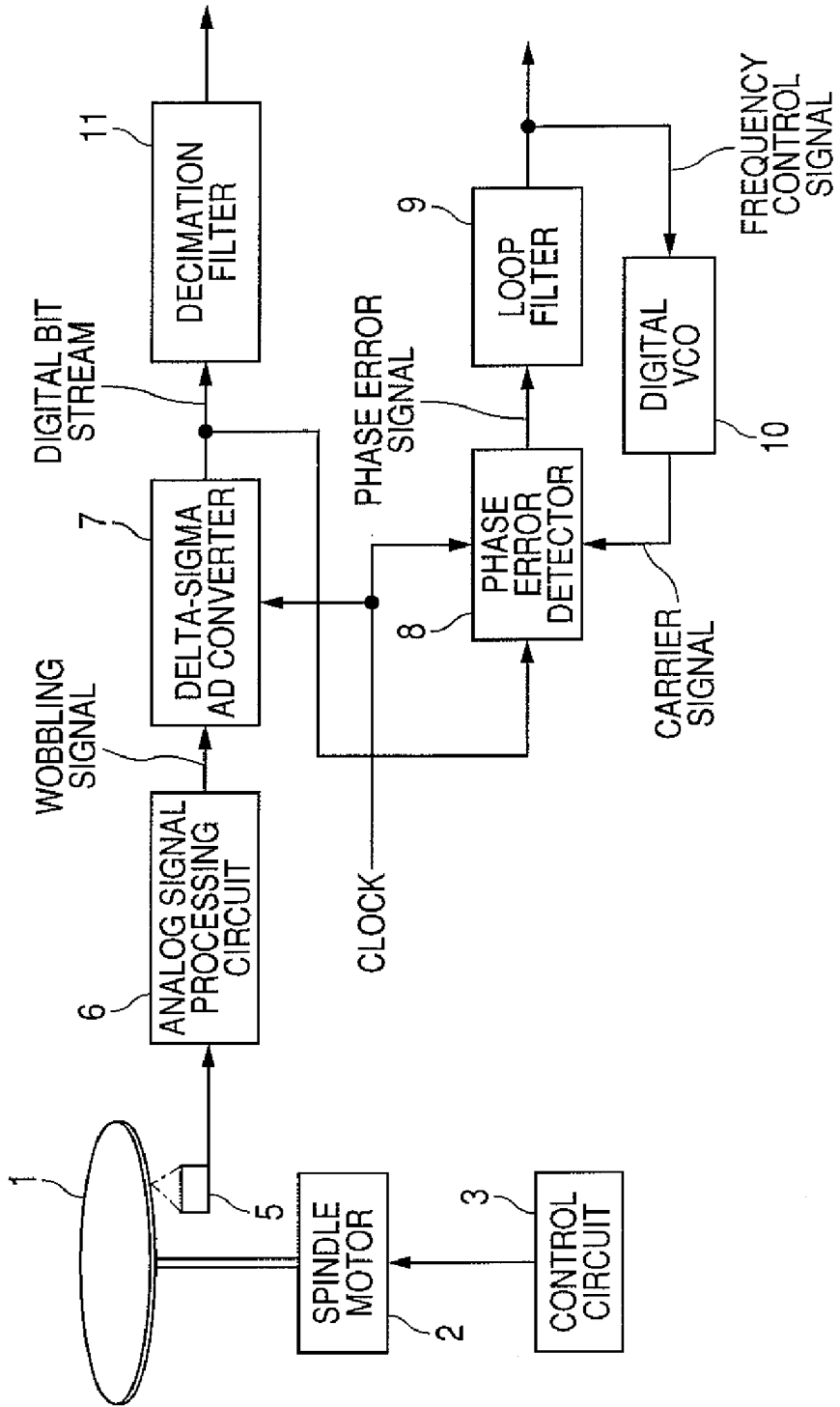
FIG. 1 is a block diagram illustrating the whole constitution of the present invention.

FIG. 1 is a block diagram illustrating a wobble PLL circuit provided in an optical disk device according to the present invention. Hereinafter, an operation of the wobble PLL circuit will be described with reference to FIG. 1.

As illustrated in FIG. 1, the wobble PLL circuit includes an optical disk 1 on which information is recorded and reproduced, a spindle motor 2 which rotates the optical disk 1, a control circuit 3 which controls rotations of motors including a motor driver for driving the spindle motor 2, an optical pickup 5 which actually executes recording and reproducing with respect to the optical disk 1, an analog signal processing circuit 6 which amplifies outputs from plural sensors included in the optical pickup 5 and generates a wobble-component signal as a push-pull output, a delta-sigma AD converter 7 which executes delta-sigma modulation, a phase error detector 8, a loop filter 9, and a digital VCO 10.

More specifically, under the control of the control circuit 3, the spindle motor 2 rotates the optical disk 1 at a proper rotation number. Then, a semiconductor laser included in the optical pickup 5 irradiates light onto the optical disk 1, and a sensor included in the optical pickup 5 receives reflection light from the optical disk 1. Here, by a not-illustrated servo circuit, the irradiation light is operated and controlled based on a signal output from the sensor in the optical pickup 5 to be led along the groove on the optical disk 1 as being focused on the relevant groove.

Further, based on a signal output from the sensor in the optical pickup 5, the reflection light from the optical disk 1 is subjected to a matrix operation by the analog signal processing circuit 6, whereby a wobbling signal is detected.

Then, the wobbling signal generated by the analog signal processing circuit 6 is input to the delta-sigma AD converter 7, and converted into a one-bit digital bit stream high-velocity sampled at an input clock frequency. Ordinarily, by a later-stage decimation filter 11, a high-band noise component is eliminated from the one-bit digital bit stream, and the acquired one-bit digital bit stream is converted into multi-bit digital data sampled at a low-rate frequency as compared with that of the operation clock of the delta-sigma AD converter 7.

Further, by the phase error detector 8, the acquired bit-stream wobbling signal is operated together with another-input carrier signal, whereby a phase difference between these signals is detected. Here, it should be noted that the phase error detector 8 executes the operation at the same clock as the operation clock of the delta-sigma AD converter 7. Incidentally, the content of the operation will be later described in detail.

By the loop filter 9, a phase error signal based on the phase error detected by the phase error detector 8 is filter-processed so as to suitably conform to a loop characteristic. Then, the filter-processed signal is output as a frequency control signal to the digital VCO 10. By the digital VCO 10, an oscillation frequency is determined based on the input frequency control signal, and a cosine wave carrier and a sine wave carrier are output according to the determined oscillation frequency. As described above, the output cosine wave carrier acts as another input carrier signal of the phase error detector 8 so as to detect the phase error between these inputs.

The digital VCO is also called an NCO (numerical control oscillator). The NCO changes an increment value of the internal counter thereof according to an input value, and outputs the sine wave by referring to a sine wave table based on the value of the internal counter, thereby outputting the sine wave of which the period changes according to the input.

Of course, it is possible for the digital VCO to generate the sine wave by generating a clock of which the frequency is higher than that of the wobbling signal, and separately dividing the generated clock.

Namely, since the wobble PLL circuit is constituted as described above, the phase of the carrier signal being the output of the VCO is locked with respect to the wobbling signal being approximately the sine wave. The output of the digital VCO 10 is supplied to a not-illustrated address detection unit as a reference for reading address information superposed on the wobbling signal. Further, to control linear velocity to be constant, the output of the digital VCO 10 is connected to a spindle control unit as spindle control information.

Figure 2:
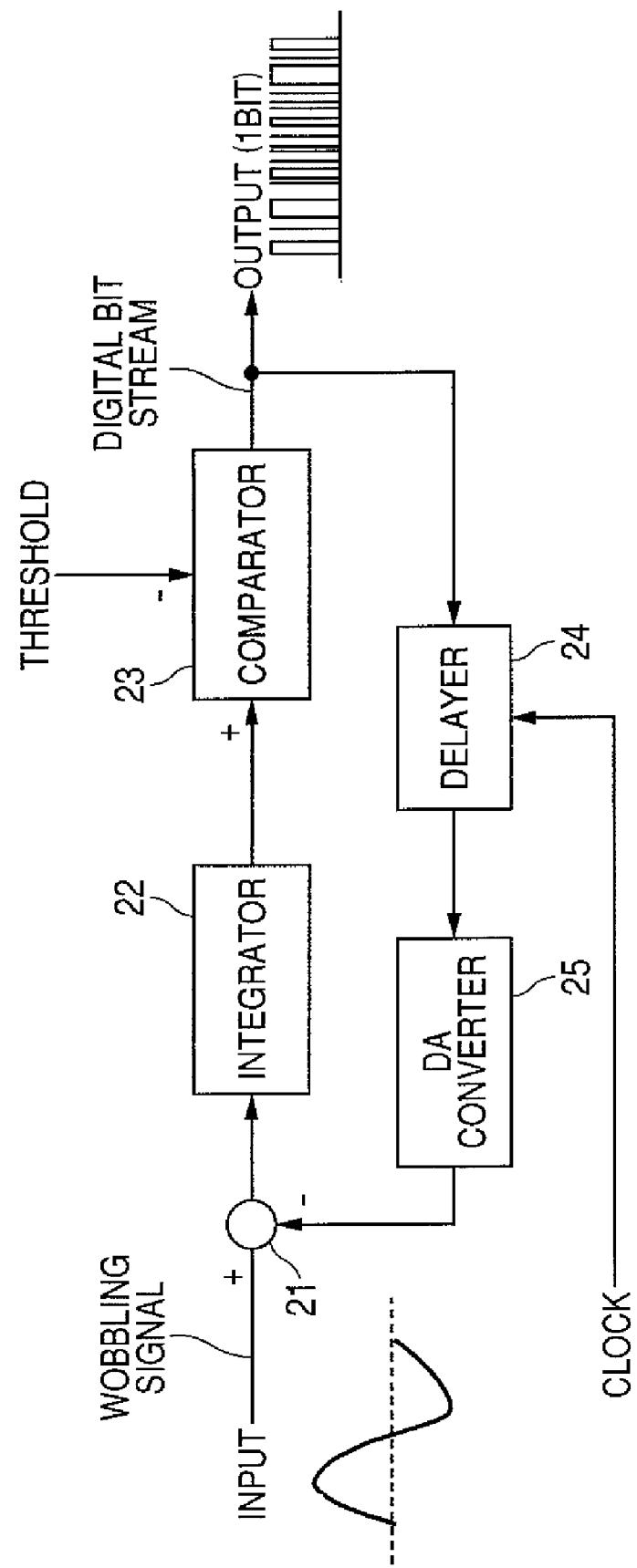
FIG. 2 is a diagram which includes a basic block diagram illustrating an AD converter using delta-sigma modulation and a diagram illustrating signal and noise spectra in the delta-sigma modulation.

Subsequently, the delta-sigma AD converter 7 illustrated in FIG. 1 will be described. That is, FIG. 2 illustrates the basic constitution of the delta-sigma AD converter 7. In FIG. 2, an illustrated input signal is equivalent to the wobbling signal being the input to the delta-sigma AD converter 7 illustrated in FIG. 1. The delta-sigma AD converter 7 includes an integrator 22, a comparator 23 for binarizing the output of the integrator 22 based on a predetermined threshold and then generating a one-bit output signal, a delayer 24 for delaying the output of the comparator 23 by one clock of 20 MHz being an operation clock, a DA (digital-to-analog) converter 25 for converting the output of the delayer 24 into analog binary having the threshold as the center level, and a subtraction circuit 21 for executing subtraction between the output of the DA converter 25 and the input signal.

Although a detailed description will be omitted, the delta-sigma AD converter has a high-velocity sampling frequency of 20 MHz though the output thereof is only one bit. Thus, the delta-sigma AD converter achieves AD conversion so as to have a high S/N ratio with respect to a low-band frequency component by shaping a noise spectrum into a high band.

Subsequently, the detail of the phase error detector 8 which is the point of the present invention will be described with reference to FIG. 3.

As illustrated in FIG. 3, the phase error detector 8 includes a sign inversion circuit 31 which multiplies the signal value and "−1" together, a switch 32, and an LPF 33.

The cosine wave carrier signal output by the digital VCO 10 illustrated in FIG. 1 is converted into a signal of which the positive or negative sign has been inverted by the sign inversion circuit 31. Then, in the switch 32, the carrier signal and the sign inverted signal of the carrier signal from the sign inversion circuit 31 are changed over by using the output of the delta-sigma converter as a changeover control signal. That is, the signal of which the sign is not inverted is selected by the switch 32 if the output of the delta-sigma AD converter is "1", and the signal of which the sign has been inverted is selected by the switch 32 if the output of the delta-sigma AD converter is "0". Then, an unnecessary component in the output of the switch 32 is eliminated by the LPF 33, thereby outputting the phase error detection signal. Incidentally, if the carrier signal is expressed as a complement of "2", "−1" time can be achieved by a NOT logic corresponding to the number of bits and an adder. In other words, "−1" time can be achieved by the NOT logic of inverting each bit and the adder for adding "1".

The above operation is executed based on the same clock as the operation clock of the delta-sigma AD converter being an output rate of the delta-sigma AD converter.

Figure 4A:
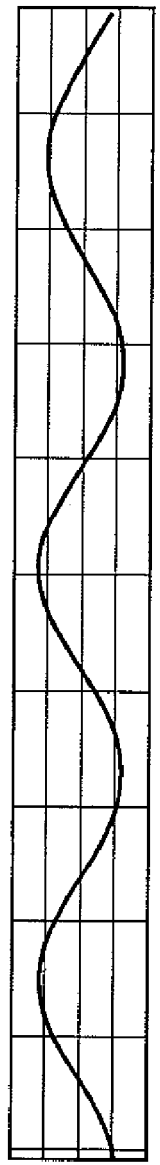
FIGS. 4A, 4B, 4C, 4D and 4E are diagrams describing signals at respective units in the first exemplary embodiment.
Figure 4B:
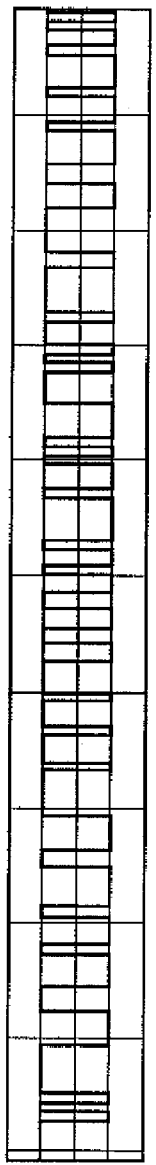
Figure 4C:
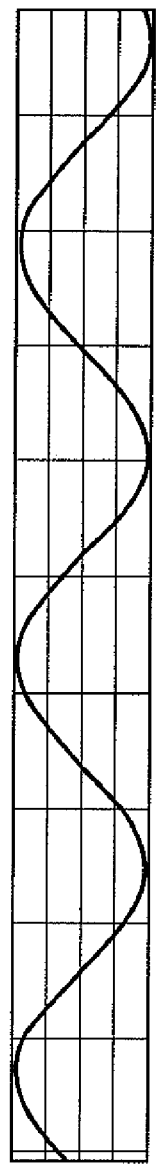

Subsequently, the circuit operation of the phase error detector 8 illustrated in FIG. 3 will be described with reference to FIGS. 4A, 4B, 4C, 4D and 4E. Here, FIG. 4A illustrates the wobbling signal output from the analog signal processing circuit 6, FIG. 4B illustrates the one-bit bit stream signal subjected to the delta-sigma modulation by the delta-sigma AD converter 7 of FIG. 1, and FIG. 4C illustrates the cosine wave carrier output of the digital VCO 10. Here, it should be noted that, although the output of the digital VCO is actually an eight-bit signal, this is expressed like an analog signal to be easily understood.

Figure 4D:
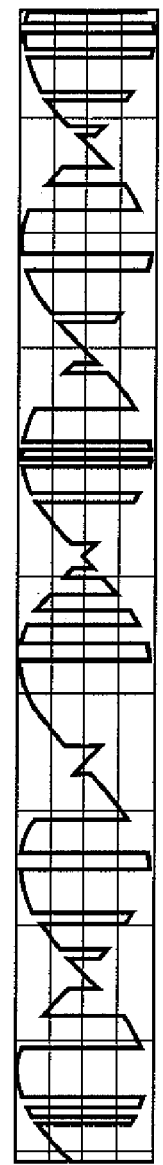
Figure 4E:
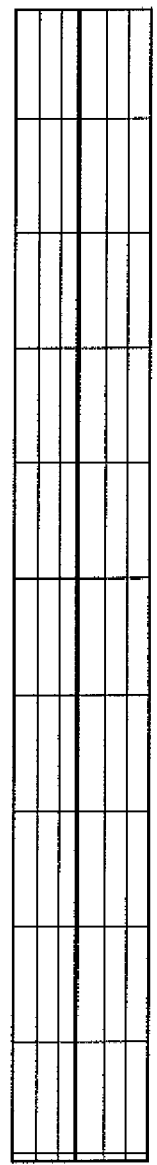
Figures 5A, 5B, 5C, 5D:
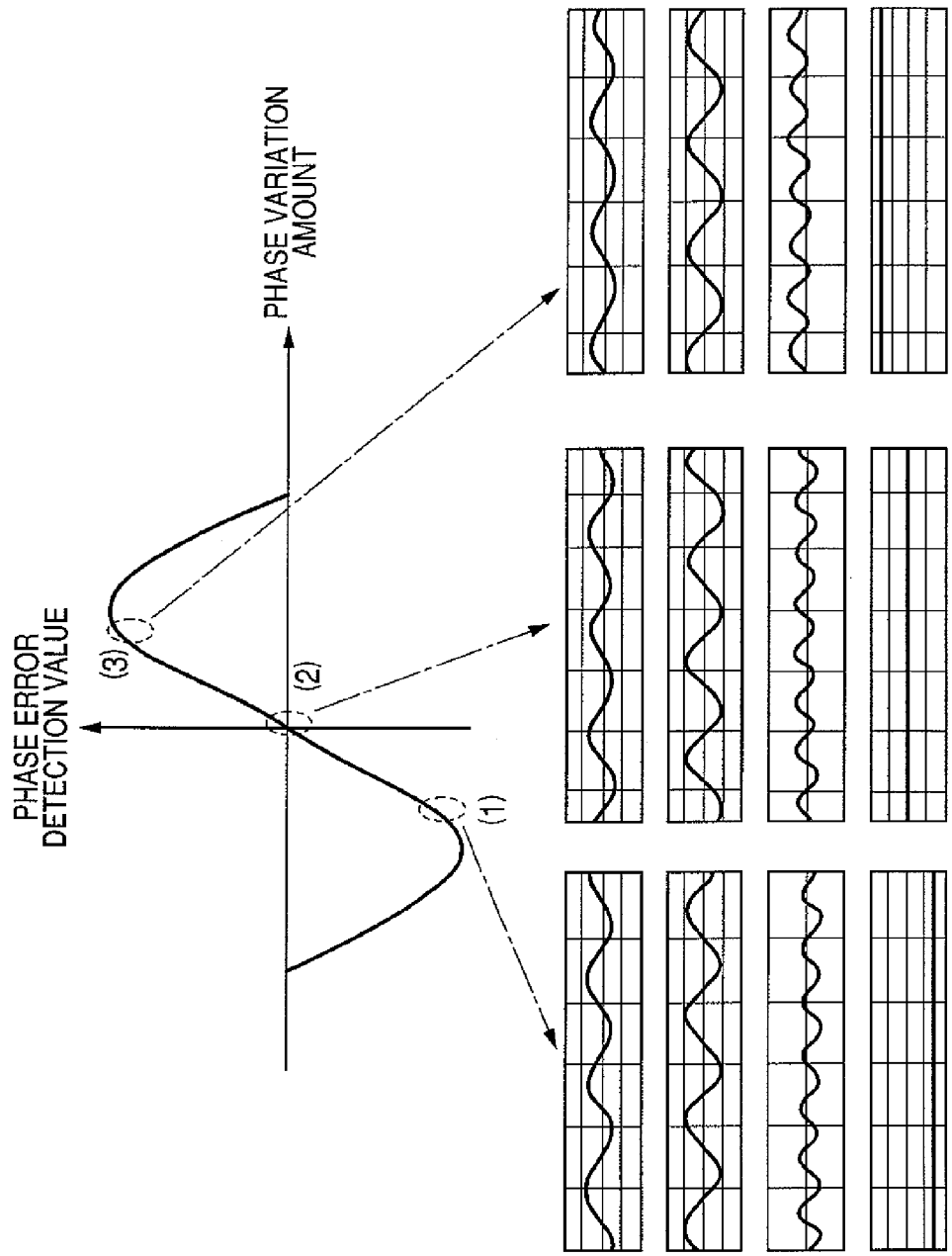
FIGS. 5A, 5B, 5C and 5D are diagrams respectively describing aspects of the phase error detector detected according to phase differences.

As described above, the switch 32 changes over the cosine wave carrier signal (FIG. 4A) and its sign inverted signal (not illustrated) output from the sign inversion circuit 31 according to H/L (high and low) of the bit stream being the delta-sigma AD modulated output (FIG. 4B), and the thus acquired signal is illustrated in FIG. 4D. The signal of FIG. 4D is smoothed by the next-stage LPF 33, and the smoothed signal is subjected to the shaping based on the carrier frequency component and the delta-sigma modulation. Thus, the noise component is eliminated from the acquired signal, and the phase error as illustrated in FIG. 4E is detected.

In the present exemplary embodiment, the multiplying process is executed by changing over the positive and negative signs of the carrier signal based on the delta-sigma modulated signal. Thus, it is possible by such multiplication to detect the frequency difference, i.e., a frequency change and a phase change, between the wobbling signal component and the carrier signal component. That is, the component of the wobbling signal is frequency-converted into a DC region.

Here, if it is assumed that the wobbling signal is equivalent to $SIN(\omega o t)$ and the carrier signal is equivalent to $COS(\omega c t)$, it is possible to calculate $SIN(\omega o t) \times COS(\omega c t) = SIN\{(\omega o - \omega c) \cdot t\} + SIN\{(\omega o + \omega c) \cdot t\}$. In this expression, "$SIN\{(\omega o - \omega c) \cdot t\}$" indicates the frequency difference component of these signals and "$SIN\{(\omega o + \omega c) \cdot t\}$" indicates the frequency sum component of these signals. That is, the frequency change of the wobbling signal is heterodyne-converted into the DC region.

FIGS. 5A, 5B, 5C and 5D are graphs respectively illustrating phase detection amounts with respect to phase variation amounts between the wobbling signal and the carrier signal. As described above, a phase error detection curve has a SIN shape. In FIGS. 5A, 5B, 5C and 5D, the states of signals at the three points (1), (2) and (3) respectively indicated by the dotted-line ovals are illustrated. More specifically, FIG. 5A indicates the wobbling signal, FIG. 5B indicates the carrier signal, FIG. 5C indicates the result of the multiplication process, and FIG. 5D indicates the signal acquired after the process by the LPF.

At the point (2) where the phase difference between the wobbling signal and the carrier signal is 90°, the phase error detection amount is zero. At the point (3) where the phases of the wobbling signal and the carrier signal are approximately the same, a positive value is output as the detection value. Further, at the point (1) where the phases of the wobbling signal and the carrier signal are opposite to each other, a negative value is output as the detection value.

Figure 6A:
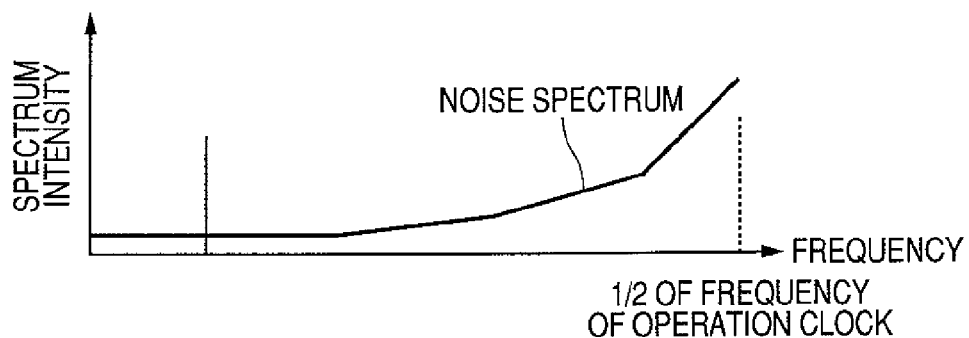
FIGS. 6A, 6B and 6C are diagrams illustrating spectra at respective units in the first exemplary embodiment.
Figure 6B:
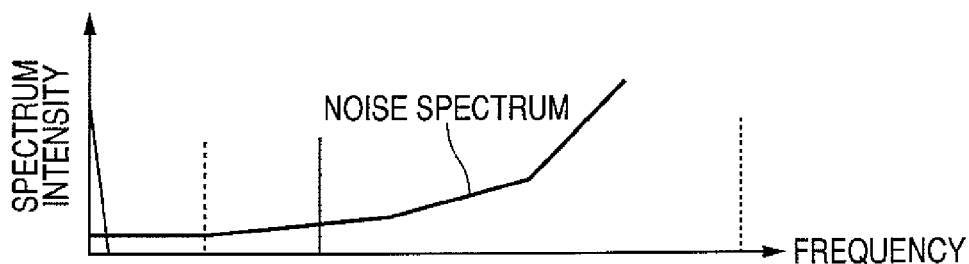
Figure 6C:
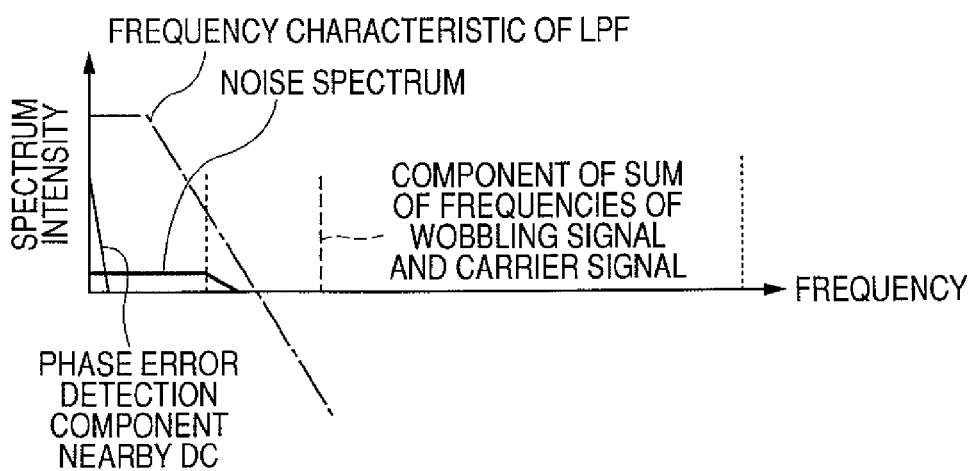

To further describe such an operation, FIGS. 6A, 6B and 6C respectively illustrate the states of frequency domains. FIG. 6A indicates a signal spectrum after the delta-sigma AD conversion. Since the wobble signal is approximately the sine wave, it has a spectrum including a peak at about 960 KHz being its frequency. Also, the wobble signal has a noise spectrum which increases as its frequency increases up to the half of 20 MHz being the sampling frequency.

If the carrier signal being the output of the VCO and its sign inverted carrier signal are mutually changed over based on the signal being the delta-sigma AD output, the multiplication process is achieved. The spectrum acquired after the multiplication process is illustrated in FIG. 6B. As can be understood from FIG. 6B, the spectrum after the multiplication process is frequency-converted into the phase error detection component existing nearby the DC being the frequency difference between the wobbling signal and the carrier signal and into the frequency sum component of the wobbling signal and the carrier signal. In this case, since the frequencies of the wobbling signal and the carrier signal are approximately the same, the frequency sum component is about 1.9 MHz approximately twice the frequency of the wobbling signal.

After then, the frequency sum component is eliminated by the LPF having a frequency characteristic as indicated by the dashed line illustrated in FIG. 6C, whereby only the phase error detection component existing nearby the DC is output. Further, the noise included in the phase error detection component at this time is only the noise corresponding to the band passed through the LPF, whereby the high-band noise component subjected to delta-sigma shaping is not included. Accordingly, the S/N ratio is improved in the phase error detection component, whereby the operation frequency of the delta-sigma AD converter can be achieved by a frequency equivalent to that of a conventional AD converter.

As described above, the AD conversion and the following multiplication process which conventionally caused the whole circuit scale increase are achieved by the delta-sigma AD converter which operates based on the clock same as a conventional operation clock and the switch, whereby it is possible to reduce whole circuit scale and power consumption as maintaining detection accuracy which is equivalent to conventional detection accuracy.

Second Exemplary Embodiment

Subsequently, a second exemplary embodiment of the present invention will be described. Since the whole constitution in the second exemplary embodiment is approximately the same as that in the first exemplary embodiment, a description thereof will be omitted. That is, in the second exemplary embodiment, the constitution of the phase error detector 8 which is different from that in the first exemplary embodiment will be described in detail.

Figure 7:
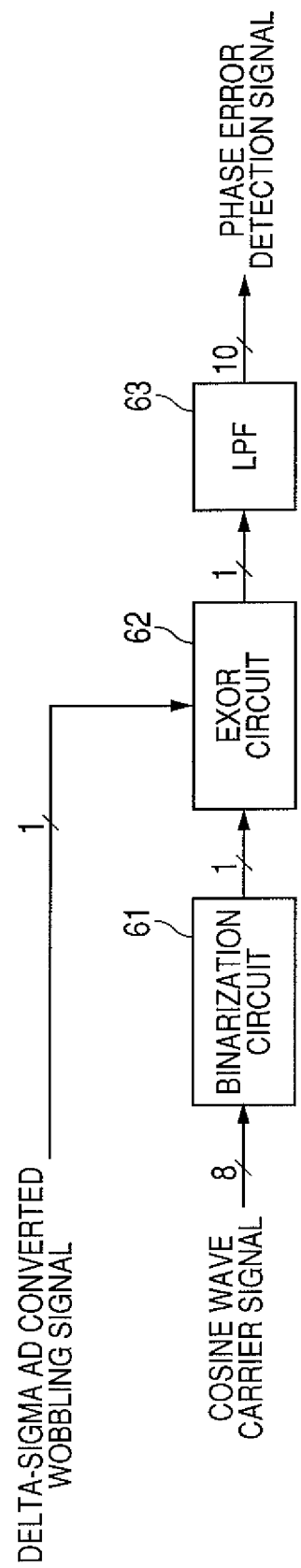
FIG. 7 is a block diagram illustrating a phase error detector according to a second exemplary embodiment.

FIG. 7 illustrates the constitution of the phase error detector 8 according to the second exemplary embodiment. As illustrated in FIG. 7, the phase error detector 8 includes a binarization circuit 61, an EXOR (exclusive OR) circuit 62, and an LPF 63.

Then, the operation of the phase error detector 8 illustrated in FIG. 7 will be described with reference to FIGS. 8A, 8B, 8C, 8D, 8E and 8F. That is, FIG. 8A indicates a wobbling signal before AD conversion, and FIG. 8B indicates a one-bit bit stream signal delta-sigma modulated by the delta-sigma AD converter.

Figure 8A:
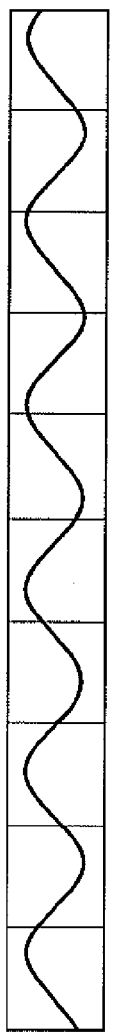
FIGS. 8A, 8B, 8C, 8D, 8E and 8F are diagrams describing signals at respective units in the second exemplary embodiment.
Figure 8B:
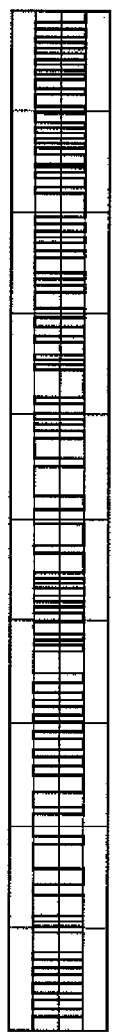
Figure 8C:
Figure 8D:
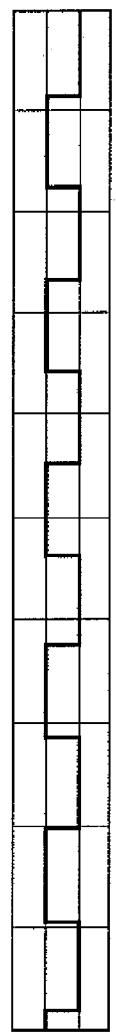
Figure 8E:
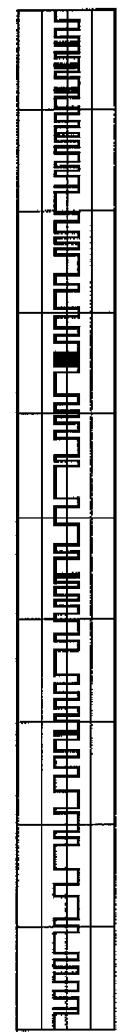
Figure 8F:
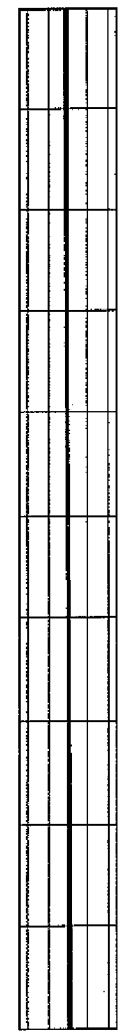

FIG. 8C indicates an input eight-bit carrier signal. The binarization circuit 61 binarizes the input carrier signal based on its center level, and then outputs a signal as illustrated in FIG. 8D. Subsequently, the EXOR circuit 62 executes an EXOR logical operation to the delta-sigma modulated one-bit bit stream signal illustrated in FIG. 8B and the output binary signal illustrated in FIG. 8D. FIG. 8E indicates a signal acquired by the EXOR logical operation. Then, the signal illustrated in FIG. 8E is smoothed by the next-stage LPF 63 to eliminate therefrom a carrier frequency component and a double carrier frequency component, whereby a phase difference as indicated in FIG. 8F is detected.

In the second exemplary embodiment, the carrier signal is changed into a binarized pulse which only indicates a sign of the carrier signal, whereby the multiplication of the carrier signal and the delta-sigma modulated wobbling signal is achieved by the EXOR logical operation.

The states of frequency domains in the second exemplary embodiment are approximately the same as those in the first exemplary embodiment, whereby a description thereof will be omitted.

Incidentally, although the EXOR circuit is used in the second exemplary embodiment, it is apparent from the exclusive OR logic to apply a constitution of inverting one based on the logic of the other by using a switch as well as the first exemplary embodiment.

In the second exemplary embodiment, since the carrier signal is binarized to acquire a one-bit signal and the delta-sigma AD converter and the EXOR circuit which output a one-bit signal are used, it is possible to remarkably reduce whole circuit scale and power consumption. Moreover, in the second exemplary embodiment, since the circuit constitution is simplified, it is possible to achieve a high-velocity operation as compared with the related art and the first exemplary embodiment.

Third Exemplary Embodiment

Subsequently, a third exemplary embodiment of the present invention will be described. Since the whole constitution in the third exemplary embodiment is approximately the same as that in the first exemplary embodiment, a description thereof will be omitted. That is, in the third exemplary embodiment, the constitution of the phase error detector 8 which is different from that in the first exemplary embodiment will be described in detail.

In the third exemplary embodiment, a switch is used as well as the first exemplary embodiment. However, this switch is not to change over the carrier signal and its sign-inverted signal, but is to change over a delta-sigma AD converted wobbling signal and its inverted signal by using a ternarized carrier signal. Here, it should be noted that the ternarized carrier signal is equivalent to a three-valued carrier signal.

Figure 9:
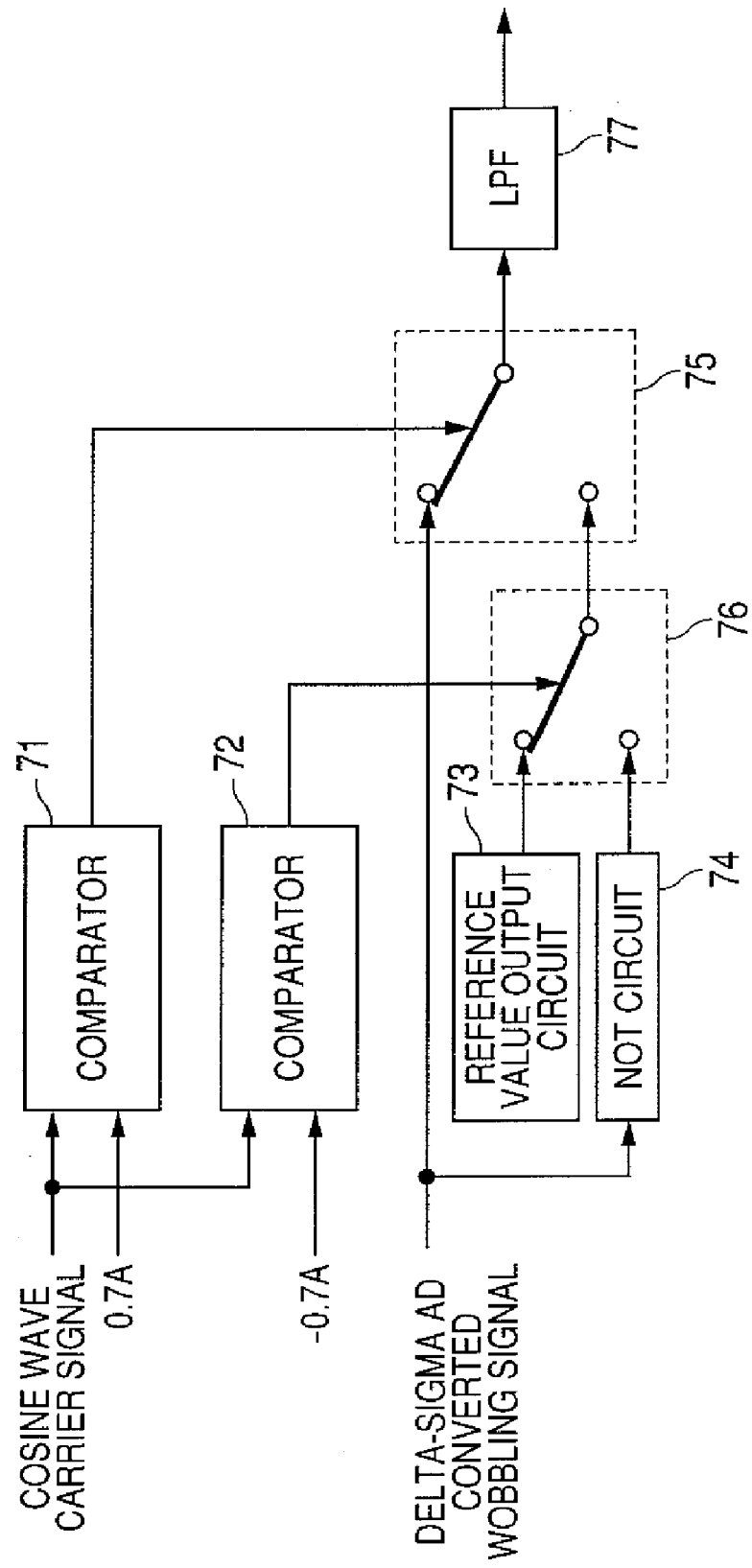
FIG. 9 is a block diagram illustrating a phase error detector according to a third exemplary embodiment.

As illustrated in FIG. 9, the phase error detector 8 includes comparators 71 and 72 each comparing input values of two systems to determine their magnitude relation, a reference value output circuit (or a zero level generation circuit) 73 outputting a signal of predetermined value, a NOT circuit (or a logical inversion circuit) 74, a first switch 75, a second switch 76, and an LPF 77. The comparator 71 compares the input carrier signal having amplitude A with another input 0.7 A, and outputs HIGH if the input carrier signal is larger than another input. Likewise, the comparator 72 compares the input carrier signal with another input −0.7 A, and outputs HIGH if the input carrier signal is larger than another input. The NOT circuit 74 inverts the input delta-sigma AD converted one-bit wobbling signal, and the reference value output circuit 73 outputs the center value of an output logical value of the delta-sigma AD converted one-bit wobbling signal.

Then, the operation of the phase error detector 8 illustrated in FIG. 9 will be described with reference to FIGS. 10A, 10B, 10C, 10D, 10E, 10F and 10G. That is, FIG. 10A indicates a wobbling signal before AD conversion, and FIG. 10B indicates a one-bit bit stream signal delta-sigma modulated by the delta-sigma AD converter.

Figure 10A:
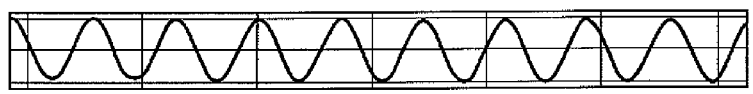
FIGS. 10A, 10B, 10C, 10D, 10E, 10F and 10G are diagrams describing signals at respective units in the third exemplary embodiment.
Figure 10B:
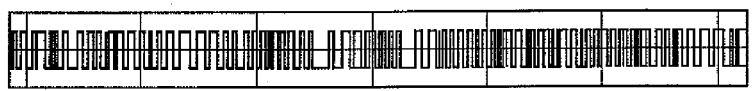
Figure 10C:
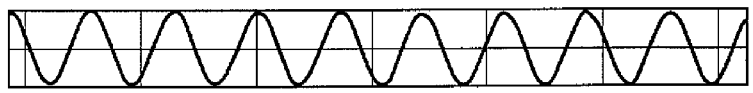
Figure 10D:
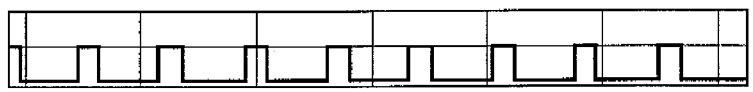
Figure 10E:
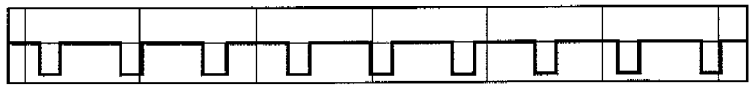

FIG. 10C indicates a cosine wave carrier signal which is assumed to have amplitude A of about 100 p-p. The comparator 71 compares the level 0.7 A=70 with the carrier signal, and outputs HIGH if the carrier signal is larger as illustrated in FIG. 10D. That is, if it is assumed that the carrier signal is COS φ, the comparator 71 outputs the signal which is HIGH within a range from φ=−45° to φ=+45°. Likewise, the other comparator 72 compares the level −0.7 A=−70 with the carrier signal, and outputs HIGH if the carrier signal is larger as illustrated in FIG. 10E. That is, if it is assumed that the carrier signal is COS φ, the comparator 72 outputs the signal which is LOW within a range from φ=135° to φ=225°.

Figure 10F:
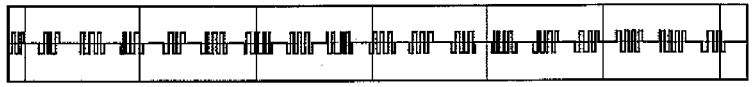

When the output of the comparator 71 is HIGH, the first switch 75 executes changeover to output the delta-sigma AD converted one-bit wobbling signal. On the other hand, when the output of the comparator 71 is LOW, the first switch 75 executes changeover to output the output signal of the second switch 76. Further, when the output of the comparator 72 is HIGH, the second switch 76 executes changeover to output the output signal of the reference value output circuit 73. On the other hand, when the output of the comparator 72 is LOW, the second switch 76 executes changeover to output the output signal of the NOT circuit 74. In conclusion, as illustrated in FIG. 10F, the first switch 75 outputs the delta-sigma AD converted wobbling signal in the case where the output of the comparator 71 is HIGH, the inverted delta-sigma AD converted wobbling signal in the case where the output of the comparator 72 is LOW, and the reference value in other cases.

Figure 10G:

Further, the LPF 77 eliminates the carrier frequency component from the output of the first switch 75 (FIG. 10F) to pass only the low-band component, thereby outputting the phase error detection signal as illustrated in FIG. 10G.

In the third exemplary embodiment, the carrier signal is considered as a ternary, and the multiplication process is achieved by inverting and not inverting the delta-sigma modulated wobbling signal during only a part of the carrier signal period.

As just described, in the third exemplary embodiment, since the delta-sigma AD converter of outputting one-bit data, the switches and the simple logical circuits, it is possible to remarkably reduce whole circuit scale and power consumption. Moreover, in the third exemplary embodiment, since the circuit constitution is simplified, it is possible to achieve a high-velocity operation as compared with the related art.

Fourth Exemplary Embodiment

Subsequently, a fourth exemplary embodiment of the present invention will be described. Since the whole constitution in the fourth exemplary embodiment is approximately the same as that in the first exemplary embodiment illustrated in FIG. 1, a description thereof will be omitted. That is, in the fourth exemplary embodiment, the constitution of the phase error detector 8 which is different from that in the first exemplary embodiment will be described in detail. In the fourth exemplary embodiment, although EXOR logic is used as well as the second exemplary embodiment, it is possible to achieve higher-precise detection by executing an EXOR logical operation with use of plural sampling points before and behind a target point.

Figure 11:
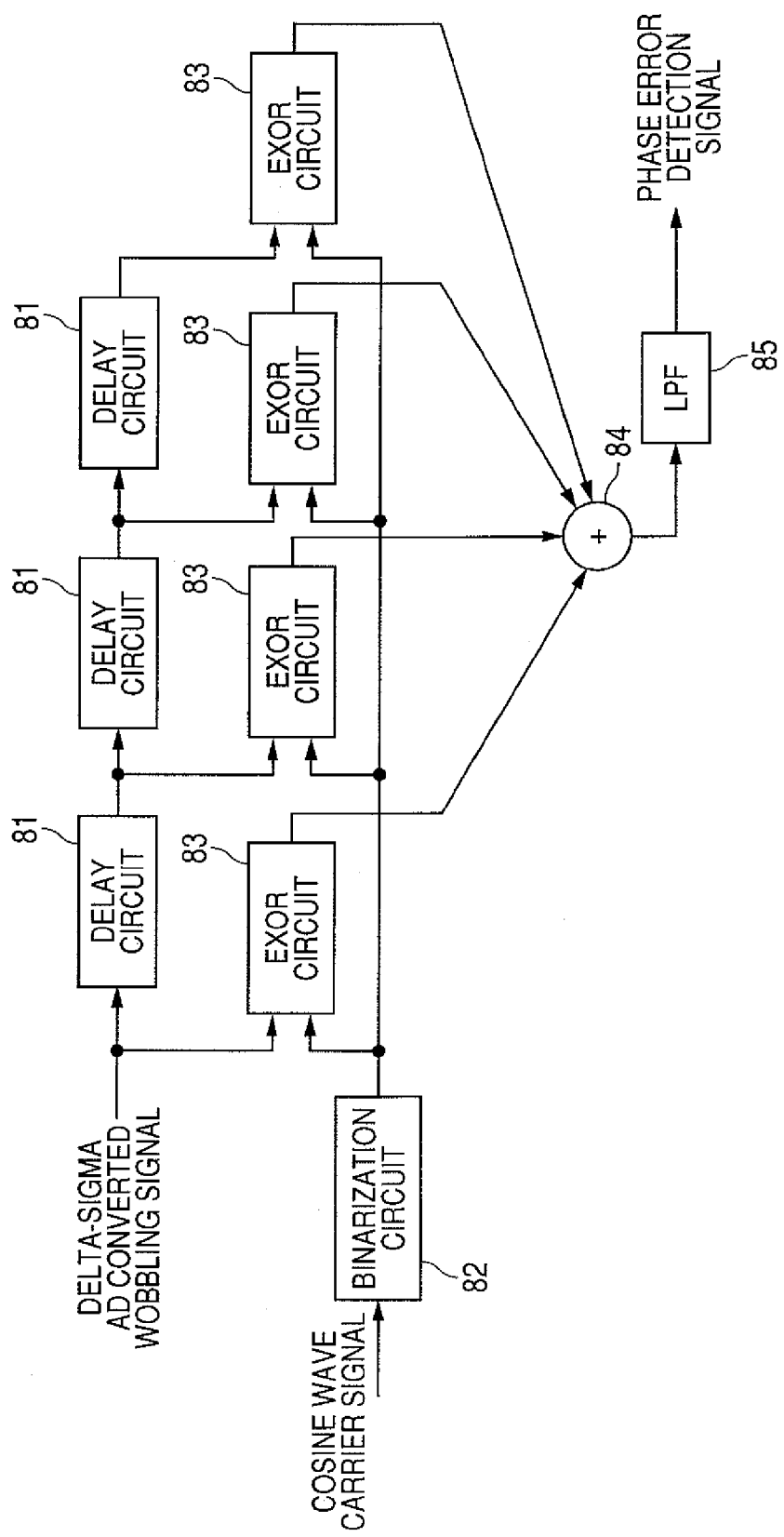
FIG. 11 is a block diagram illustrating a phase error detector according to a fourth exemplary embodiment.

FIG. 11 illustrates the constitution of the phase error detector 8 according to the fourth exemplary embodiment. As illustrated in FIG. 11, the phase error detector 8 includes delay circuits 81 each generating a delay corresponding to a one clock sample, a binarization circuit 82 binarizing an input and outputting only a sign, EXOR circuits 83, a four-input adder 84, and an LPF 85. In FIG. 11, the three delay circuits 81 are connected in series.

The delta-sigma modulated wobbling signal is input to the delay circuit 81 and delayed by one sample clock, the acquired signal is further input to the next delay circuit 81 and delayed by one sample clock, and then the acquired signal is input to the next delay circuit 81 and delayed by one sample clock. On the other hand, the cosine wave carrier signal is binarized by the binarization circuit 82 and then output as a one-bit pulse. The input of the phase error detector 8 and the output of the delay circuit 81 are respectively input to one input terminal of each EXOR circuit 83. Further, the output of the binarization circuit 82 is input to the other input terminal of each EXOR circuit 83. By the constitution as illustrated in FIG. 11, EXOR logic between each delay result and the binarized carrier signal is achieved. Then, the adder 84 adds together the respective outputs results of the EXOR circuits 83, and executes a moving average process after EXOR logic. Subsequently, the LPF 85 eliminates the carrier frequency component from the output of the adder 84 to pass only the low-band component, thereby outputting the phase error detection signal.

In the fourth exemplary embodiment, since the operation in the second exemplary embodiment is expanded up to plural bits before and behind, the states of the signals at the respective points are approximately the same as those in the second exemplary embodiment, whereby a description thereof will be omitted. In the fourth exemplary embodiment, since the operation results at the sampling points before and behind are used, the multiplication process is executed as eliminating a noise subjected to shaping into a high band through the delta-sigma modulation.

Incidentally, in the fourth exemplary embodiment, a bit operation is executed to one-bit data input from two systems by the EXOR circuit. However, as well as another exemplary embodiment, it is possible to easily achieve the same effect by using a NOT circuit and switches.

Further, in the fourth exemplary embodiment, the outputs of the EXOR circuits are not directly added together by the adder. That is, a coefficient unit is added to each signal line immediately before the adder so as to have a higher-order filter characteristic. Accordingly, since the higher-order filter characteristic is achieved, a high-band noise component can be directly eliminated by the phase error detector. As a result, the phase error detector according to the fourth exemplary embodiment also has a function of eliminating carrier frequency component or the like, so that the later-stage LPF may be omitted.

Ordinarily, in a bit stream which is a delta-sigma modulated output, information is not expressed only by one bit, that is, a signal level before AD conversion is expressed by plural bits before and behind. For this reason, in the fourth exemplary embodiment, in addition to the operation for achieving the EXOR logic between the delta-sigma modulated wobbling signal and the binarized carrier signal, an addition process for acquiring a moving average from plural bits before and behind, e.g., four samples, is executed. By executing the addition process like this, it is possible to achieve, without using any multiplier, higher-precise phase error detection with a simple circuit constitution.

Fifth Exemplary Embodiment

Subsequently, a fifth exemplary embodiment of the present invention will be described. Since the whole constitution in the fifth exemplary embodiment is approximately the same as that in the first exemplary embodiment illustrated in FIG. 1, a description thereof will be omitted. That is, in the fifth exemplary embodiment, the constitution of the phase error detector 8 which is different from that in the first exemplary embodiment will be described.

FIG. 12 illustrates the constitution of the phase error detector 8 according to the fifth exemplary embodiment. As illustrated in FIG. 12, the phase error detector 8 includes a delta-sigma modulator 91, a subtracter 92, a binarization circuit 93, a switch 94 and an LPF 95.

Then, the operation of the phase error detector 8 illustrated in FIG. 12 will be described with reference to FIGS. 13A, 13B, 13C, 13D, 13E, 13F, 13G and 13H. That is, FIG. 13A indicates a wobbling signal before AD conversion, and FIG. 13C indicates a one-bit bit stream signal delta-sigma modulated by the delta-sigma AD converter 7.

Figure 13A:
FIGS. 13A, 13B, 13C, 13D, 13E, 13F, 13G and 13H are diagrams describing signals at respective units in the fifth exemplary embodiment.
Figure 13B:
Figure 13C:
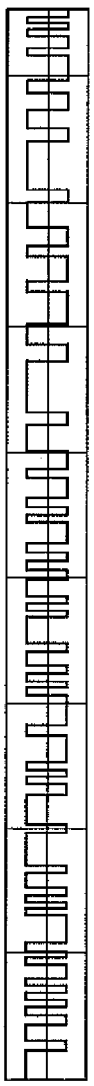

FIG. 13B indicates a carrier signal before delta-sigma modulation.

Figure 13D:
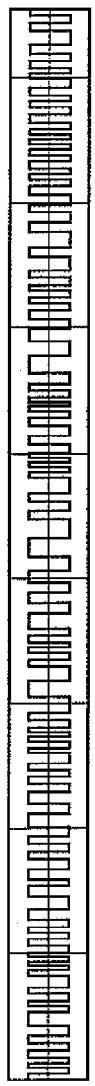
Figure 13E:
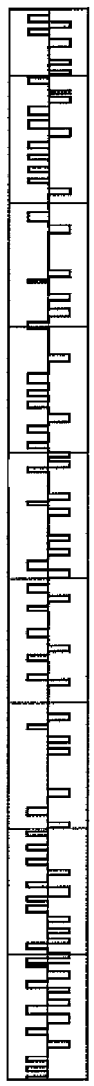

The delta-sigma modulator 91 executes delta-sigma conversion to the sine wave carrier signal (FIG. 13B) output from the VCO to output a one-bit bit stream signal as illustrated in FIG. 13D. The subtracter 92 executes a difference operation for one bit between a wobbling signal already delta-sigma modulated and the carrier signal delta-sigma modulated by the delta-sigma modulator 91 to output a ternary two-bit operation result as illustrated in FIG. 13E.

Figure 13F:

Subsequently, the binarization circuit 93 binarizes a cosine wave carrier signal to output a binarized pulse as illustrated in FIG. 13F. That is, with respect to the signal illustrated in FIG. 13F, if it is assumed that the sine wave carrier signal is SIN $\phi$, the binarization circuit 93 outputs the pulse which is HIGH within a range from $\phi=-90°$ to $\phi=90°$ based on $\phi=0°$ as the center.

Figure 13G:
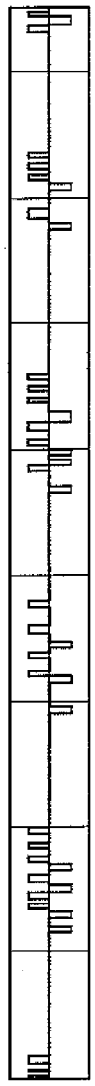
Figure 13H:
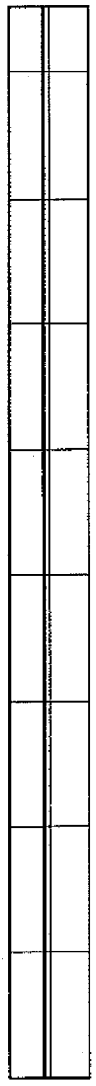
Figure 14:
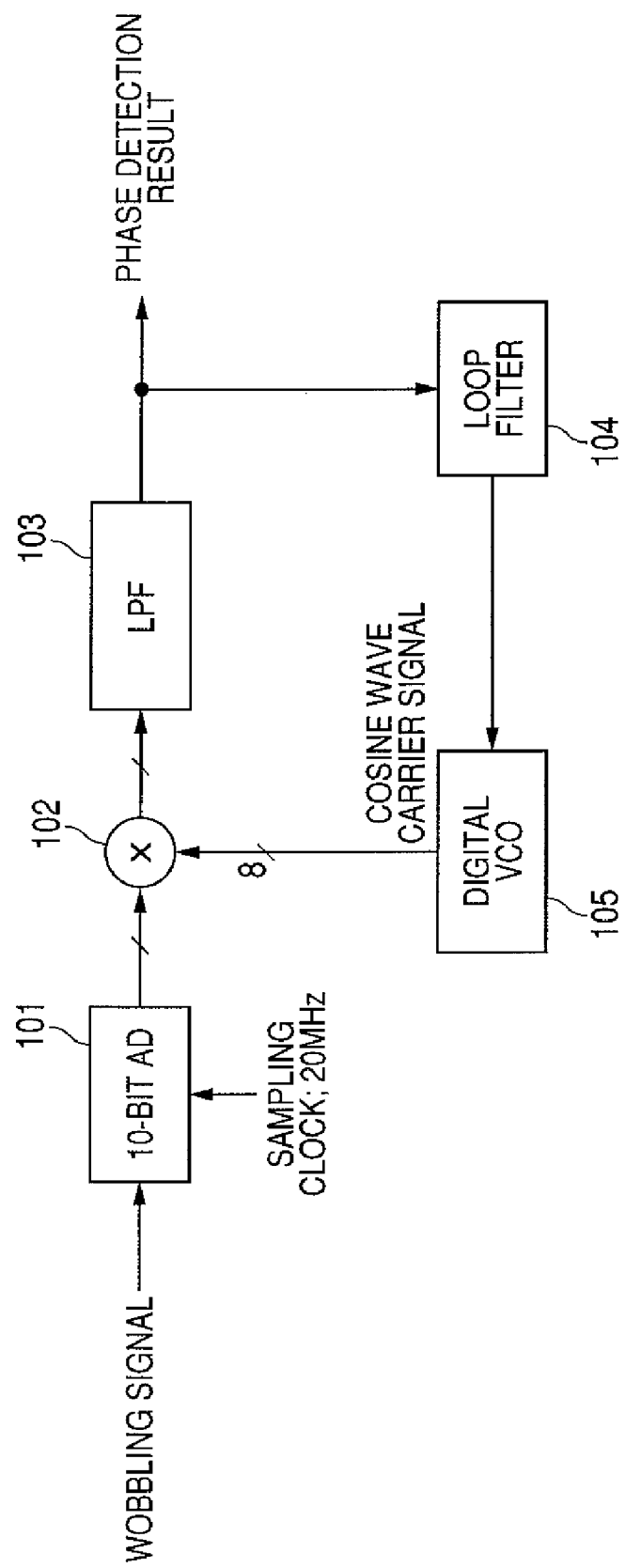
FIG. 14 is a block diagram for describing the phase error detector in the related art.

If the binarized pulse (FIG. 13F) acting as a control signal is HIGH, the switch 94 outputs the result of the subtracter 92. On the other hand, if the binarized pulse is LOW, the switch 94 outputs a value "zero". A signal illustrated in FIG. 13G is the output signal of the switch 94. Then, the LPF 95 eliminates the carrier frequency component from the output signal of the switch 94 to pass only the low-band component, thereby outputting a phase error detection signal illustrated in FIG. 13H.

In the fifth exemplary embodiment, based on the binarized pulse acquired from the cosine wave carrier signal, a difference between the wobbling signal and the sine wave carrier signal is calculated only in the vicinity of a zero crossing point on the rise of the sine wave carrier signal. Accordingly, if the wobbling signal advances as compared with the sine wave carrier signal, a positive value is acquired as a result of the calculation. On the other hand, if the wobbling signal delays as compared with the sine wave carrier signal, a negative value is acquired.

In the fifth exemplary embodiment, the states of frequency domains are approximately the same as those in the first exemplary embodiment, whereby a description thereof will be omitted.

Incidentally, the data is changed over to "zero" by the switch after the subtraction was executed in the fifth exemplary embodiment. However, it is possible to change the order of operations. More specifically, it is possible to change over the input to the subtracter to "zero" and then execute the subtraction.

Further, in the fifth exemplary embodiment, the available period of the signal of the subtracter is set to be within the range from −90° to 90°. However, it is possible to change the available period by changing the threshold of the binarization circuit 93.

In the fifth exemplary embodiment, even if the carrier signal is the delta-sigma modulated bit stream signal, any multiplier is unnecessary. That is, by adopting the simple circuit constitution including the subtracter, the switch and the like, it is possible to remarkably reduce whole circuit scale and power consumption.

While the present invention has been described with reference to the exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-184452, filed Jul. 4, 2006, which is hereby incorporated by reference herein in its entirety.

What is claimed is:

1. An optical disk device that records and/or reproduces information by irradiating an optical beam to an optical disk having a wobbled track, the optical disk device comprising:
    a wobbling detector adapted to detect a wobbling signal based on a reflection light of the irradiated optical beam;
    a delta-sigma modulator adapted to execute delta-sigma modulation to the detected wobbling signal based on a predetermined operation clock;
    a VCO (voltage controlled oscillator) of which an output oscillation frequency changes according to an input;
    a phase error detector adapted to detect a phase error between the delta-sigma modulated wobbling signal and a carrier signal output by the VCO, and output a phase error signal based on the detected phase error; and
    a loop filter adapted to execute a filter process to the phase error signal output by the phase error detector,
    wherein the VCO uses an output of the loop filter as an input signal, and
    wherein the phase error detector outputs the phase error signal by inverting positive and negative signs of an output of the delta-sigma modulator based on a signal acquired by ternarizing an output of the VCO by using positive and negative two thresholds.

2. A PLL circuit that executes delta-sigma modulation to a wobbling signal detected based on reflection light of an optical beam irradiated to an optical disk having a wobbled track, and that generates a carrier signal synchronized with the delta-sigma modulated wobbling signal, the PLL circuit comprising:
    a phase error detector adapted to detect a phase error between the delta-sigma modulated wobbling signal and a carrier signal, and to output a phase error signal based on the detected phase error;
    a loop filter adapted to execute a filter process to the phase error signal output by the phase error detector; and
    a VCO (voltage controlled oscillator) adapted to output the carrier signal based on an output of the loop filter,
    wherein the phase error detector outputs the phase error signal by inverting positive and negative signs of the delta-sigma modulated wobbling signal based on a signal acquired by ternarizing an output of the VCO by using positive and negative two thresholds.

* * * * *